April 4, 1967 G. F. DIXON 3,312,311

AUTOMATIC BRAKE ADJUSTER

Filed Jan. 29, 1965

*INVENTOR*
GEORGE F. DIXON
BY *William J. Perry*
ATTORNEY

United States Patent Office 3,312,311
Patented Apr. 4, 1967

3,312,311
AUTOMATIC BRAKE ADJUSTER
George F. Dixon, St. Joseph, Mich., assignor to Clark Equipment Company, a corporation of Michigan
Filed Jan. 29, 1965, Ser. No. 429,031
9 Claims. (Cl. 188—79.5)

This invention relates to a brake adjusted, and more particularly to an automatic adjuster for friction brakes.

In friction brakes, as for example of the drum or shoe type, wear necessarily occurs on the frictionally engaging surfaces, so that the travel or movement required to effect engagement between the surfaces constantly increases. This results in the need for periodic adjustment in order to avoid the irritating and dangerous lag occasioned between application of the brake and the engagement of the braking surfaces. Such adjustment, however, is only partially effective for the purpose, since the wear on the surfaces and the consequent constantly increasing lag in brake engagement recurs immediately after the adjustment. Another adjustment ordinarily is not made until the lag has reached the undesirable proportion required for it to be definitely sensed in brake application, since it is not practical to effect adjustment very frequently. The cost involved in such periodic adjustments, including the removal from service of the vehicle or apparatus on which the brake is employed, has led to a demand for automatic brake adjusters, and various proposals have been made for this purpose. All of these devices, however, are subject to certain objections and deficiencies. The present invention provides a friction brake adjuster which avoids the objections to such devices and provides continuous adjustment corresponding directly to the wear of the engaging brake surfaces. The adjuster of the present invention operates automatically without the need for setting, attention, or servicing, eliminates any need for periodic removal of the apparatus from service in order to effect adjustment of the brakes, and is safe and positive in operation.

It is accordingly an object of the invention to provide a brake adjuster which operates automatically and positively to effect continuous adjustment of friction brake elements in accordance with the wear of the engaging surfaces.

It is another object to provide an automatic adjuster for friction brakes which limits separating movement of the engaging brake members to the same distance upon each operation of the brake, and assures the same travel distance of the members in effecting braking engagement.

Another object is the provision of an automatic brake adjuster which is simple and inexpensive yet positive, safe, and effective in operation.

A further object is the provision of an automatic adjuster for friction brakes which requires no modification or adaptation of the brake structure.

Other and further objects, advantages and features of the invention will be apparent to those skilled in the art from the following detailed description, taken in conjunction with the accompanying drawings, in which.

Figure 1:
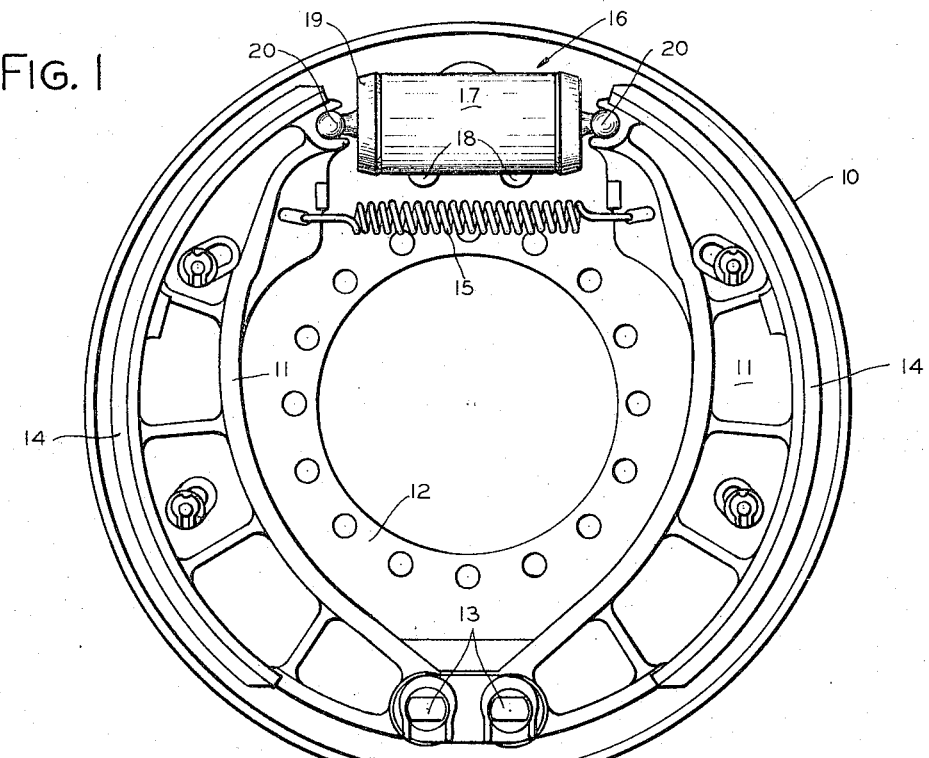
FIGURE 1 is a side elevational view of a brake structure incorporating the adjuster of this invention.

Referring first to FIG. 1 of the drawings, there is shown a hydraulically operated friction brake of the drum or shoe type commonly employed for the wheels of automotive vehicles. The brake comprises a brake drum 10 which may be suitably mounted for rotation with a wheel, arranged for engagement of its inner surface by a pair of brake shoes 11 pivotally mounted on a torque plate 12 as by anchor pins 13. The torque plate 12 may be secured on a fixed part of the vehicle in any suitable manner, as by bolting. Each of the brake shoes is provided in conventional manner with a lining 14 of frictional material for engagement with the inner surface of the brake drum 10. The brake shoes are normally held in a retracted position in spaced relation to the brake drum by a return spring 15.

Application of the brake, that is, movement of the brake shoes 11 into engagement with the brake drum 10, is effected by a hydraulic cylinder and piston device or brake cylinder, generally indicated as 16, comprising an openended cylinder 17 disposed between the free ends of the brake shoes, and mounted on the torque plate 12 as by bosses 18 internally threaded to receive bolts passed through boots 19 of rubber or other suitable material that close the opposite ends of the cylinder 17, except for a central aperture in each through which extends an actuating rod 20 projecting from within the cylinder into engagement with the adjacent brake shoe 11. Outward movement of the actuating rods 20 causes engagement of the brake shoes 11 with the drum 10, the rods being moved inwardly of the cylinder by the force of the return spring 15 upon retraction of the brake shoes from the applied position.

The inner end of each shoe actuating rod 20 engages in a suitable recess 21 formed in the outer surface of each of two telescopically related pistons 22 and 23. Each of the pistons slidably engages the inner surface of the cylinder 17, and is provided with a suitable circumferential seal 24, in this case shown as an O-ring disposed in the usual groove. The piston 22 has an axial protrusion or stem 25 extending toward the piston 23, which is provided with a sleeve or skirt portion 26 defining an axial recess 27 extending into the piston itself, and having an enlarged blind end portion 28. In fully inwardly telescoped relation of the pistons 22 and 23, the enlarged recess portion 28 receives a retaining member or element 30, in this case taking the form of an annular washer or disc with four equally spaced resilient fingers or prongs 31 extending radially outwardly therefrom. The size of the enlarged portion 28 of the recess diametrically of the piston 23 is such as to accommodate the retaining member with a desired degree of peripheral clearance. The remainder of the recess 27, however, is of a cross-sectional shape and size such that the retaining element 30 cannot be received therein without flexing of the fingers or prongs 31. Put another way, the prongs 31 extend outwardly of the retaining member 30 to points spaced from the center thereof by distances greater than half the transverse distance across the recess, or project outwardly beyond the cross-sectional area or axial projection of the recess.

The retaining member 30 is mounted on a reduced portion 32 of the stem 25 of piston 22, the reduced portion having an axial extent greater than the thickness or axial dimension of the retaining member 30, so that the retaining member may move axially thereon. The reduced portion 32 is provided intermediate the length of the stem, so as to define the bottom of an annular groove 33 receiving the retaining member 30 for axial movement. In the present instance, the groove 33 is illustrated as provided by a screw having an unthreaded shank portion which serves as the reduced stem portion 32, and a threaded portion 34 screwed into a suitably formed recess in the end of the stem 25 proper, the screw in effect serving as part of the stem. The head 35 of the screw preferably is of the same size as the end portion 36 into which the screw is threaded, this portion 36 being reduced to allow the fingers or prongs 31 to extend completely radially outwardly thereof, or substantially so.

The pistons 22 and 23 are spaced from each other in the fully inwardly telescoped relation by the stem 25 and skirt 26, their approach toward each other being illustrated as limited by engagement of the screw head 35 with the blind end of the recess. The pistons define therebetween an annular fluid chamber 37 to which hydraulic fluid under pressure may be admitted through an opening 38 to effect movement of the pistons outwardly, or away from each other. Such movement is transmitted to the brake shoes 11 through the actuating rods 20, thus engaging the brake linings 14 against the inner surface of the brake drum 10. Upon release of pressure on the fluid, the pistons 22 and 23 are moved inwardly toward each other under the influence of the return spring 15, the fluid flowing out through the opening 38. A bleeder passage 39, which may be suitably controlled, is provided extending to atmosphere from the top of the fluid chamber 37 so as to allow the exhaust of air which may accumulate in the chamber, and the maintenance of a full supply of fluid in the chamber.

In new or newly relined condition, the brake in its retracted position appears substantially as shown in FIG. 1, with the brake shoes retracted from the brake drum and in a predetermined spaced relation thereto. The corresponding position of the adjuster is that shown in FIG. 2, in which the retaining member 30 lies within the enlarged recess portion 28, with the screw head 35 providing engaging against the end of the recess. When the brakes are first applied, the brake shoe linings 14 are worn down slightly, and as the brakes are continuously reapplied in use, the brake linings become more worn. Since upon each release of the brake the pistons and other parts return to the position shown in FIG. 2, the spacing between the drum 10 and the linings 14 in the retracted condition of the brake shoes becomes constantly greater. The brake shoes must thus move through a greater distance in order to effect engagement of the linings 14 with the brake drum, which is accomplished by a constantly greater separating or outward telescoping movement of the pistons 22 and 23, as will be obvious, until with conventional brake structures an adjustment becomes necessary. With the present construction, however, in each application of the brakes the retaining member 30 is moved closer to the main portion of the recess 27, until the wear has reached a point at which the retaining member 30 enters the recess 27, as shown in FIG. 3, the resilient fingers or prongs 31 being forced into a bent and stressed condition in which the edges thereof bite into or grip the surface of the recess 27, which is of course the inner surface of the skirt 26. The effect of this engagement of the retaining member 30 with the surface of recess 27 is to limit the approach of the pistons 22 and 23 toward each other by means of the retaining member, instead of by the engagement of the head 35 of the screw with the end of the recess, as in FIG. 2.

Figure 2:
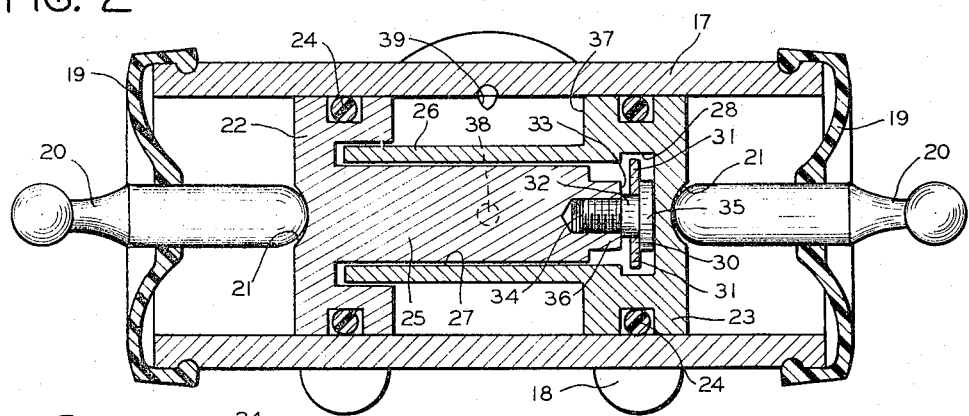
FIGURE 2 is an enlarged longitudinal sectional view through the adjuster.
Figure 3:
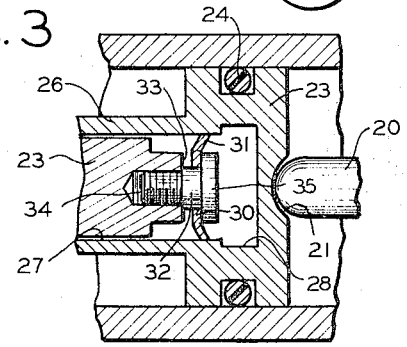
FIGURE 3 is a fragmentary view of a portion of the adjuster as shown in FIG. 2, illustrating another position of the parts.
Figure 4:
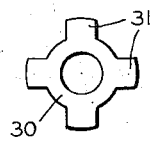
FIGURE 4 is a front elevational view of the retaining element shown in FIGS. 2 and 3.

The retaining member may move in the recess 27 only in the leftward direction as viewed in FIG. 2, and is moved slightly in that direction each time an application of the brakes results in additional wear. Thus, since the retaining member 30 assumes progressively more leftward positions in the recess 27, the pistons 22 and 23 are held in progressively greater spaced relation to each other in the retracted condition of the brake shoes, and the amount of relative outward movement thereof during each application of the brake is maintained substantially constant. Accordingly, the movement or travel of the brake shoes required to effect engagement of the brake linings 14 with the brake drum does not change, since the progressive wear of the brake linings is compensated for by the progressive leftward positioning of the member 30 in the recess 27. In other words, the gap between the linings 14 and the brake drum is held to the predetermined constant distance. This distance is determined by the amount of relative axial movement permitted between the retaining member 30 and the stem 25, specifically the reduced portion 32 thereof. This axial movement corresponds to the difference between the thickness or axial dimension of the retaining member 30 and the axial dimension, or width, of the groove 33. It will be evident that upon relative outward or separating movement of the pistons 22 and 23, the retaining member 30 is engaged by the screw head 35 which provides one wall of the groove 33. When the brake is released, and the brake shoes retracted by the spring 15, the pistons are moved relatively inwardly toward each other, but only until the end of the reduced stem portion 36 which defines the left-hand wall of groove 33 comes into engagement with the retaining member. Further retracting movement of the brake shoes is thus halted when they have been moved from the brake drum a distance corresponding to the relative rightward movement of the stem 25 permitted by the above-mentioned dimensional relationship between the retaining member and the groove.

The brake adjuster thus, by progressively increasing the spacing between the pistons in correspondence to the amount of wear on the braking surfaces, maintains substantially constant the gap between the brake drum and the brake shoes in the retracted position, and thus the movement or travel of the brake shoes in application of the brakes. It may be noted that the period during which the retaining member 30 is disposed within the enlarged portion 28 of the recess 27, before it engages in the recess itself, during which time it does not serve to adjust the brakes, corresponds to the initial or "break-in" period during which new brake linings are worn down relatively rapidly, to require adjustment of the brakes after a relatively short time. Such adjustment is attended to automatically by the brake adjuster of the invention.

It will be appreciated that while in the illustrative embodiment of the invention the brake shoes 11 are shown as provided with facings or linings of suitable frictional material, the invention is applicable to friction brakes dispensing with such linings, since wear will occur between the engaging surfaces of the brake in any case, and adjustment will therefore be unnecessary.

While the invention is shown as employed in a drum-type brake such as is commonly employed on automotive vehicles, it will be evident that the invention is readily applicable to other types of friction brakes, including those in which a single shoe or similar member is movable into engagement with another member. It will also be appreciated that although the brake is disclosed as operated by hydraulic fluid, the invention is not limited to hydraulic brakes, but may be employed with friction brakes operated by mechanical linkage or other non-fluid means.

It will be understood that the single embodiment of the invention illustrated herein is exemplary of the inventive concept and that the invention is not limited to such embodiment, since modifications and variations thereof may be made without departing from the spirit and scope of the invention as set forth in the appended claims.

I claim:

1. In a brake assembly including a brake drum, a pair of brake shoes movable into and out of engagement with said brake drum, fluid-operable means for moving said shoes into engagement with the drum, means for supplying pressure fluid to said fluid-operable means, and means for returning the shoes from said engagement, the improvement comprising a pair of telescopically related pistons in said fluid-operable means, one having an axial projection and the other having a recess receiving said projection therein, said recess having a blind end enlargement thereof, an annular groove formed in said projection and disposed in said recess enlargement in fully inwardly telescoped relation of said pistons, a resilient annular member engaging about said projection in said groove having an axial dimension appreciably less than the width of the groove and also having a plurality of spaced prongs extending radially outwardly to points beyond the cross-sectional area of said recess but within the corresponding area of the recess enlargement, said prongs being adapted for biting engagement with the surface of said recess upon relative outward telescoping movement of said pistons disposing said annular member in flexed condition within the recess to limit inward telescoping movement of the pistons to a distance equal to the difference between the width of said groove and the thickness of the annular member.

2. In a brake assembly including a brake drum, a pair of brake shoes movable into and out of engagement with said brake drum, fluid-operable means for moving said shoes into engagement with the drum, means for applying pressure fluid to said fluid-operable means, and means for returning the shoes from said engagement, the improvement comprising a pair of telescopically related pistons in said fluid-operable means, one having an aperture with an enlarged end and the other having a projection extending in said aperture, an annular element slidable axially on said projection received in said enlarged aperture end in fully inwardly telescoped relation of said pistons and having a plurality of spaced resilient prongs extending radially outwardly to points beyond the axial projection of said recess, and means limiting axial movement on the projection of said annular element, said prongs being adapted for biting engagement with the inner surface of said recess upon relative outward telescoping movement of said pistons sufficient to dispose the annular element engaged within the recess with the prongs in stressed condition to limit inward telescoping movement of the pistons to a distance equal to said limited axial movement.

3. The improvement in a brake assembly substantially as defined in claim 2, in which said limiting means comprise an annular groove formed in the projection and providing a reduced portion of the projection receiving the annular element thereon.

4. In a brake assembly including a brake drum, a pair of brake shoes movable into and out of engagement with said brake drum, means for moving said shoes into engagement with the drum, and means for returning the shoes from said engagement, the improvement comprising a pair of members comprised in said moving means and telescopically movable relative to each other, one of said members having a projection, the other member having a recess receiving said projection at all times, said recess being formed with an enlargement thereof, an annular groove formed in said projection and disposed in said recess enlargement in fully inwardly telescoped relation of said members, an annular element engaging about said projection in said groove having an axial dimension appreciably less than the width of the groove and also having a plurality of spaced resilient prongs extending radially outwardly of the cross-sectional area of said recess but not of the corresponding area of the recess enlargement, said prongs being initially disposed in said enlargement in said fully inward member relation and flexed in biting relation with the surface of said recess upon relative outward telescoping movement of said members sufficient to dispose said annular element within the recess, whereby to limit inward telescoping movement of the members to a distance equal to the difference between the width of said groove and the thickness of the annular member.

5. In a brake assembly including a brake drum, at least one brake shoe movable into and out of engagement with said brake drum, means for moving said shoe into engagement with the drum, and means for returning the shoe from said engagement, the improvement comprising first and second members comprised in said moving means, said first member having a projection, said second member having an aperture receiving said projection at all times, said aperture having an enlarged portion, one of said members being telescopically movable relative to the other, a retaining element slidable axially on said projection and received in said enlarged end portion upon full inward telescoping movement of said one member relative to the other, said retaining element having a plurality of resilient prongs extending radially outwardly of the cross section of said aperture but falling within the cross section of the enlarged portion, and means limiting the axial movement of the retaining element on the projection, said prongs biting against the surface of said aperture upon outward telescoping movement of the one member relative to the other member sufficient to draw the prongs into the aperture, whereby to limit said inward telescoping movement of the one member to a distance equal to said limited axial movement.

6. In a brake assembly including a brake drum, at least one brake shoe movable into and out of engagement with said brake drum, means for moving said shoe into engagement with the drum, and means for returning the shoe from said engagement, the improvement comprising a pair of members included in said moving means, a first of said members having a projection, the second of said members being telescopically movable relative to said first member and having an aperture receiving said projection at all times, said aperture having an enlarged portion, a retaining element slidable axially on said projection received in said enlarged portion upon full inward telescoping movement of said second member relative to the first member and having a plurality of resilient prongs extending radially outwardly of the cross section of said aperture but falling within the cross section of the enlarged portion, and means limiting the axial movement of the retaining member on the projection, said prongs stressedly engaging the surface of said aperture upon outward telescoping movement of the second member relative to the first member sufficient to draw the prongs into the aperture.

7. The improvement in a brake assembly substantially as defined in claim 6, wherein said limiting means comprise an annular groove in said projection providing a reduced projection portion receiving the annular element thereon and also providing a pair of walls between which said element is movable, the distance between said walls being equal to the axial dimension of said element plus the extent of said limited axial movement.

8. Friction brake adjusting means automatically compensating for wear between a first brake member and a pair of second brake members movable into frictional engagement therewith, comprising first and second members telescopically movable relative to each other and respectively connected to said second brake members to effect said movement thereof, said first movable member having a projection and said second movable member having an aperture receiving said projection therethrough, a retaining element slidable axially of the projection and disposed axially outwardly of said aperture in fully inwardly telescoped relation of the movable members, said retaining element having a plurality of resilient prongs projecting radially outwardly relative to the aperture surface when disposed axially outwardly thereof and stressedly engaging said surface to limit inward telescoping movement of the movable members after relative outward telescoping movement thereof sufficient to dispose the retaining element within the aperture, and means limiting said axial movement of the retaining member.

9. Friction brake adjusting means automatically compensating for wear between a first brake element and a second brake element movable into frictional engagement therewith, comprising a first member having a projection, and a second member telescopically movable relative to said first member and connected to said second brake member to effect said movement thereof, said second movable member having an aperture receiving said projection therethrough, a retaining element slidable axially of the projection and disposed axially outwardly of said aperture in fully inwardly telescoped position of the second member, said retaining element having a plurality of resilient prongs projecting radially outwardly relative to the aperture surface when disposed axially outwardly thereof and stressedly engaging said surface to limit inward telescoping movement of the second member upon disposition of the retaining element within the aperture by relative outward telescoping movement of the second member, and means limiting said axial movement of the retaining member.

References Cited by the Examiner

UNITED STATES PATENTS

| | | | |
|---|---|---|---|
| 1,668,730 | 5/1928 | Pearson | 188—79.5 |
| 1,800,380 | 4/1931 | Fishback | 188—79.5 |
| 3,085,663 | 4/1963 | Jakeways | 188—196 |

FOREIGN PATENTS 76,776  10/1961  France.
(1st addition of 1,227,387)

DUANE A. REGER, *Primary Examiner.*